United States Patent [19]
Parker

[11] 3,946,887
[45] Mar. 30, 1976

[54] BALE HANDLING APPARATUS

[76] Inventor: Gary D. Parker, Moran, Kans. 66755

[22] Filed: Dec. 26, 1974

[21] Appl. No.: 536,637

[52] U.S. Cl. .......................... 214/653; 214/147 G
[51] Int. Cl.² ........................................ B66F 9/18
[58] Field of Search... 214/653, 147 G, 6 B, DIG. 4, 214/766; 294/61

[56] References Cited
UNITED STATES PATENTS

| | | | |
|---|---|---|---|
| 2,693,285 | 11/1954 | Buschbom | 214/147 G X |
| 3,529,735 | 9/1970 | Wehde | 214/147 G |
| 3,677,428 | 7/1972 | Mallett | 214/147 G |
| 3,880,305 | 4/1975 | Van Polen | 214/147 G |

Primary Examiner—Albert J. Makay
Attorney, Agent, or Firm—Fishburn, Gold & Litman

[57] ABSTRACT

A bale handling apparatus for lifting and handling a large round hay bale, such as for loading on trucks, and positioning for storage, wherein the bale handling apparatus includes a frame structure connected to an implement hitch of a prime mover, such as an agricultural tractor, and having a pair of laterally spaced arms swingably mounted on a trailing edge portion of the frame structure and each having a bale engaging and holding member on the trailing end portion thereof and selectively movable into and out of engagement with a respective end of a bale by an extensible member connected to leading end portions of the arms.

8 Claims, 7 Drawing Figures

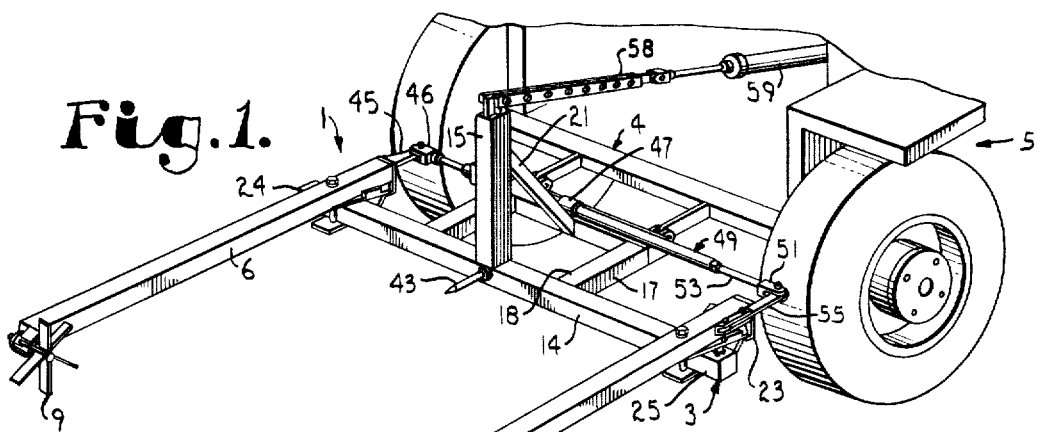
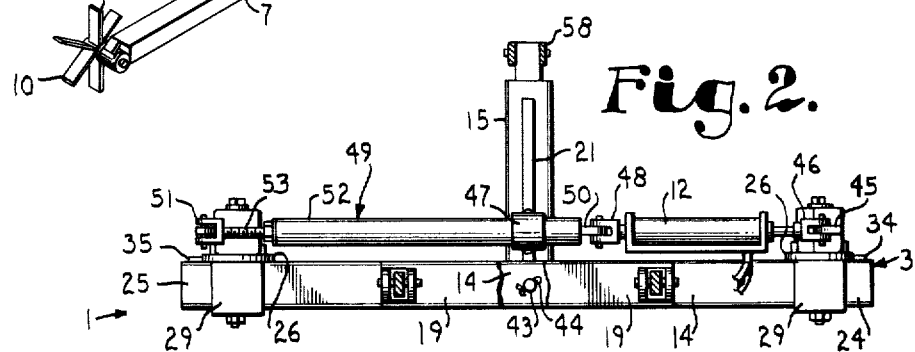
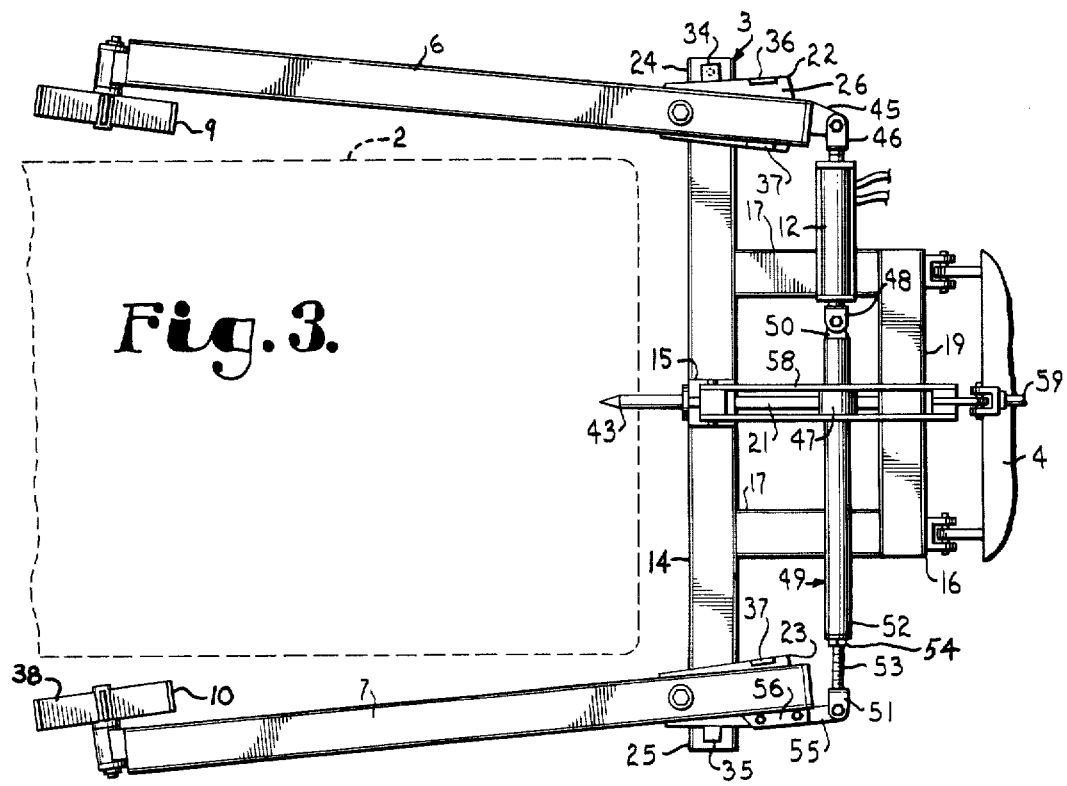

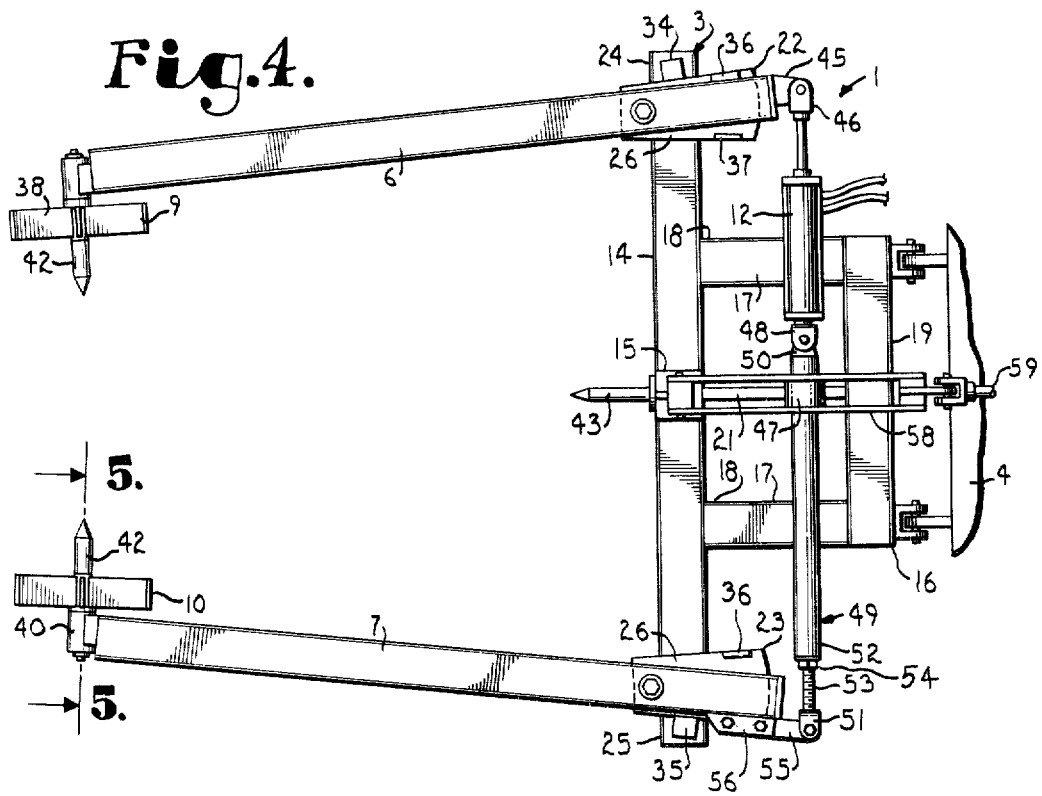
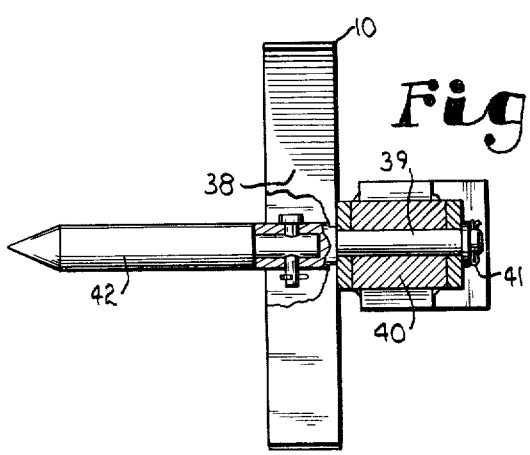
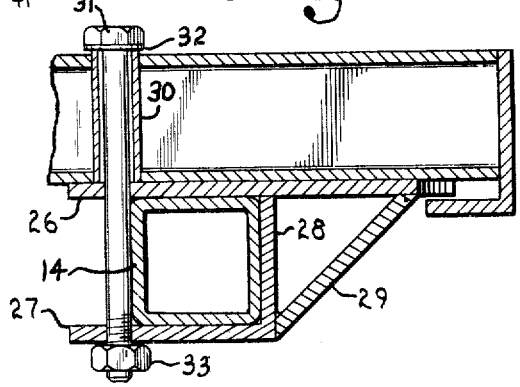
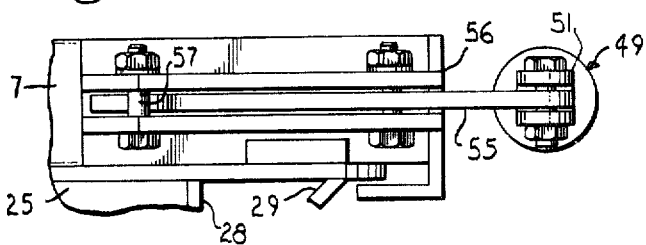

BALE HANDLING APPARATUS

The present invention relates to bale handling apparatus and more particularly to a bale handling apparatus adapted for lifting and handling a large round hay bale, such as for loading on trucks and positioning for storage.

The size of hay bales has substantially increased in recent years and equipment is available for forming large bales having the hay generally in a strip wound in a spiral convolution. The bales are approximately 6 feet in diameter and between 4 and 6 feet long. While such bales are of substantial weight and have certain advantages over smaller bales, they have been difficult to handle in moving same about a field and delivering same to a storage or feeding area. Conventional bale handling equipment has been found to be inadequate to properly and safely handle such large bales because of the large size and weight thereof.

The principal objects of the present invention are: to provide a bale handling apparatus which is adapted to be mounted on an agricultural tractor for raising or lifting a large bale to load same on a truck and to position same for storage; to provide such an apparatus that can be secured to a conventional three-point hitch for selectively raising and lowering trailing portions of the bale handling apparatus; to provide such an apparatus with a pair of swingably mounted arms and power actuated extensible means to move bale engaging members toward and away from each other thereby selectively grasping a bale therebetween and releasing same; to provide such an apparatus wherein the bale engaging means is rotatably mounted on the trailing ends of the arms; to provide such an apparatus which is operable for selectively raising and lowering the hay bale and transporting same to a feeding location; to provide such an apparatus having means adapted to hold the hay bale against unrolling when being moved by the apparatus; to provide such an apparatus having the extensible means positioned adjacent a leading edge portion of the apparatus so as to be protected from engagement with the hay bale while handling; to provide such an apparatus having means to limit swinging of the bale engaging means on the end portions of the arms toward and away from each other; and to provide such a hay bale handling apparatus which is economical to manufacture, durable in construction, positive in operation, easy to maintain and particularly well adapted for the proposed use.

Other objects and advantages of this invention will become apparent from the following description taken in connection with the accompanying drawings wherein are set forth by way of illustration and example certain embodiments of this invention.

The drawings constitute a part of the specifications and include an exemplary embodiment of the present invention and illustrate various objects and features of the hay bale handling apparatus.

FIG. 1 is a perspective view of a hay bale handling apparatus embodying features of the present invention and shown mounted on a prime mover.

FIG. 2 is an end elevational view of the bale handling apparatus showing a leading end portion of the apparatus.

FIG. 3 is a plan view of the apparatus showing the arms in an open position to receive a hay bale therebetween.

FIG. 4 is a plan view of the apparatus showing arms in a bale clamping and holding position.

FIG. 5 is an enlarged fragmentary transverse sectional view taken on line 5—5, FIG. 4 and showing a bale engaging member and mounting thereof.

FIG. 6 is an enlarged fragmentary longitudinal sectional view showing swingable mounting of one of the arms.

FIG. 7 is an enlarged fragmentary side elevational view showing mounting of one end of extensible means for opening and closing the trailing end portions of the arms.

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

Referring more in detail to the drawings:

In the disclosed embodiment of the present invention, the reference numeral 1 designates generally a bale handling apparatus for lifting and handling a large round hay bale 2, such as for loading on trucks, and positioning for storage. The bale handling apparatus 1 includes a frame structure 3 operably connected to an implement hitch 4 of a prime mover 5, such as an agricultural tractor. The bale handling apparatus 1 has a pair of laterally spaced elongated arms 6 and 7 swingably mounted on the frame structure 3. Bale engaging and holding members 9 and 10 are mounted on trailing end portions of the arms 6 and 7 respectively and are selectively movable into and out of engagement with a respective end of the hay bale 2 by an extensible member 12 operatively connected to leading end portions of the arms 6 and 7.

The frame structure 3 provides means for swingably supporting the arms 6 and 7 and for attaching same to the prime mover 5. The frame structure 3 is illustrated as having an elongated beam 14 of a suitable structural member. The frame 3 includes portions for connecting to the tractor hitch 4 and is illustrated as having a control upright post 15 and a generally U-shaped lower connector 16 consisting of parallel legs 17 having ends 18 suitably connected to the beam 14, as by welding, and a transverse member 19 secured to the leading ends of the legs 17. The post 15 and lower connector 16 are provided with connectors for the three point tractor hitch 4 as later described. The beam 14, post 15, legs 17 and transverse member 19 may be of any structural shape and are illustrated as being box members, such as substantially square tubes for great strength with relatively light weight.

A suitable brace or stiffener 21 extends between an upper end portion of the upstanding post 15 and the transverse member 19 to thereby define a rigid frame portion for connection to a suitable conventional tractor hitch 4.

The arms 6 and 7 are elongated members and may be formed of any suitable structural member, such as beams, channels or the like and in the illustrated structure, are elongated box beams or substantially square tubes for strength. The arms preferably have a generally flat lower surface, for a purpose later described.

A pair of laterally spaced saddle members 22 and 23 are mounted on opposite end portions 24 and 25 respectively of the beam 14. The saddle members 22 and 23 are illustrated as generally C or U-shaped structures and each have upper and lower plate portions 26 and 27 in engagement with generally flat upper and lower surfaces of the respective opposite end portions 24 and 25 of the beam 14. A wall 28 extends between and is secured to the upper and lower portions 26 and 27 and is in engagement with the leading side of the beam 14.

The lower surface of the upper portion 26 is generally flat to be mounted on the generally flat upper surface of the beam 14. The upper surface of the upper portion 26 of each of the saddle members 22 and 23 is generally flat to slidingly support the generally flat lower surface of a respective one of the arms 6 and 7. The upper plate portion 26 of each of the saddle members 22 and 23 extends forwardly beyond the wall 28 to thereby provide additional bearing area for the respective arms 6 and 7. An inclined brace member 29 is connected to the wall 28 or plate portion 27 and the end of the upper portion 26 thereby providing a substantially rigid structure.

The saddle members 22 and 23 are suitably mounted on the opposite end portions 24 and 25 of the beam 14. In the illustrated structure, the fastening of the saddle members 22 and 23 and the pivotal mounting of the arms 6 and 7 thereon includes a bushing 30 extending through aligned apertures in the arms 6 and 7 and respective upper and lower portions 26 and 27 of the saddle members. A suitable pivot member, such as a bolt 31, extends through the aligned apertures and has a head portion thereof in engagement with suitable washers 32. A suitable fastening member, such as a nut 33, is mounted on the bolt 31 to retain the pivotal connection of the arms on the saddle members.

The bushing 30 extends through the arms 6 and 7 and has one end thereof in engagement with the upper surface of the upper portion 26 of the respective saddle member. The bushing 30 has an upper end positioned above an upper surface of the respective arm whereby the washer 32 is not in engagement with the respective arm to permit swinging movement thereof. The bolt 31 is in engagement with the trailing edge or surface of the beam 14. Tightening the nut 33 effects clamping engagement of the upper and lower portions 26 and 27 of the saddle members 22 and 23 with upper and lower surfaces of the beam 14.

The arms 6 and 7 are swingably mounted on the beam 14 and are generally transverse or normal to the beam 14 and cooperate therewith to define a generally open and unobstructed space rearwardly of the beam 14 to receive the hay bale 2 between the arms 6 and 7.

The illustrated mounting of the saddle members 22 and 23 on the beam 14 and the engagement of the wall 28 with the leading edge or surface of the beam 14 and engagement of the bolt 31 with the trailing edge or surface of the beam 14 substantially prevents movement of the saddle members 22 and 23 transverse to the beam 14. Movement of the saddle members 22 and 23 longitudinally of the beam 14 is substantially restricted by the clamping of the upper and lower portions 26 and 27 of the saddle members 22 and 23 with upper and lower surfaces of the beam 14 and by stop members 34 and 35 positioned on the opposite end portions 24 and 25 respectively of the beam 14. The stop members 34 and 35 are illustrated as pins each having an enlarged head portion in engagement with a side edge portion of the upper plate portion 26 of the respective saddle member to thereby limit movement thereof laterally of the frame structure 3.

Each of the saddle members 22 and 23 have a first upstanding ear 36 extending upwardly from an outer edge portion of the upper portion 26 thereof whereby the first ear 36 is positioned to be engaged by the respective arm to thereby limit swinging movement of the trailing end portions of the arms 6 and 7 toward each other.

Each of the saddle members 22 and 23 have a second upstanding ear 37 extending upwardly from an inwardly facing edge portion of the upper portion 26 thereof and is thereby positioned to be engaged by the respective arm to limit swinging movement of the trailing end portions of the arms 6 and 7 away from each other.

The bale engaging and holding members 9 and 10 are rotatably mounted on the trailing end portions of the arms 6 and 7 to thereby permit rotation of the bale 2, as for unrolling. The bale engaging and holding members 9 and 10 are adapted to effect clamping engagement with respective opposite ends of the hay bale 2. In the illustrated structure, a plurality of arms 38 extend radially outwardly from a shaft or axle 39 which is mounted in a suitable bushing 40 on the trailing end of a respective one of the arms 6 and 7. The axle 39 is removably mounted on the respective arms 6 and 7, as by a suitable keeper, such as a cotter pin 41.

The bale engaging and holding members 9 and 10 may have an axial bale penetrating portion 42 thereon which is illustrated as an elongated prong or spike removably mounted on the axle 39 to thereby define an axis for rotation of the hay bale 2.

It is desirable to hold the hay bale 2 against rotation while handling, therefore, a projection or spike 43 is removably mounted on the upstanding post 15 of the frame structure 3 and is positioned on the longitudinal center line or axis of the frame structure 3. The projection 43 is adapted to extend into a side portion of the hay bale 2 to thereby restrict rotation of the hay bale. The projection 43 extends through suitable apertures in the upstanding post 15 and is removably retained thereon, as by a suitable keeper, such as a cotter pin 44.

The extensible member 12 may be any suitable power operated member, such as a hydraulic and selectively operated by the hydraulic system of the prime mover 5. The extensible member 12 has opposite ends thereof connected to the leading end portion of the arms 6 and 7 for selectively effecting swinging movement of the trailing end portions of the arms 6 and 7 and the bale holding members 9 and 10 thereon with the movement toward each other of the bale holding members 9 and 10 being effective to move same into clamping engagement with opposite ends of the hay bale 2.

In the illustrated structure, an ear 45 extends from the leading end of one of the arms, for example arm 6, and one end portion 46 of the extensible member 12 is pivotally mounted on the ear 45. A sleeve 47 is mounted on the frame structure 3 and an other end portion 48 of the extensible member is positioned adjacent the sleeve 47. The illustrated other end portion 48 has an enlarged portion positioned against one end of the sleeve 47.

An adjustable link 49 has one end portion 50 thereof extending through the sleeve 47 and pivotally connected to the enlarged portion of the other end portion 48 of the extensible member 12. An other end 51 of the adjustable link 49 is pivotally connected to the leading end portion of the other arm 7. The link 49 may be any suitable adjustable member and in the illustrated structure, the link 49 includes an internally threaded cylinder 52 and an externally threaded shaft or rod 53 received therein. A lock nut 54 is mounted on the shaft or rod 53 and is movable into engagement with an end of the cylinder 52 to thereby maintain a selected length of the adjustable link 49.

In the illustrated structure, the other end 51 of the adjustable link 49 is pivotally mounted on one end of a plate 55 having an intermediate portion thereof mounted on a bracket 56 which is mounted on an outwardly facing surface of the other arm 7. The bracket 56 has vertically spaced plates with the plate 55 positioned therebetween. The other end of the plate 55 is tapered and a stop member 57 is mounted on the bracket 52 to limit movement of the plate 55 between the spaced plates of the bracket 56 whereby extension of the extensible member 12 effects clamping engagement of the bale handling members 9 and 10 with the opposite ends of the hay bale 2 and retraction of the extensible member 12 effects swinging movement of the arms and separation of the bale holding members 9 and 10 to thereby release a hay bale and to receive therebetween an other hay bale 2.

An adjustable arm 58 has one end portion thereof pivotally connected to an upper end portion of the upstanding post 15 of the frame structure 3. The adjustable arm 58 has a free end adapted to be pivotally connected to an extensible member 59 on the prime mover 5. The extensible member 59 of the prime mover 5 forms one part of a three-point hitch 4 of the prime mover 5. The transverse member 19 of the frame structure 3 has suitable means thereon for being pivotally connected to the remaining portions of the implement hitch 4 of the prime mover 5 whereby extension and retraction of the extensible member 59 on the prime mover 5 raises and lowers the trailing end portions of the arms 6 and 7 thereby raising and lowering a hay bale 2 clamped between the bale holding members 9 and 10. In using a hay bale handling apparatus constructed as illustrated and described, the extensible member 12 is retracted to swing the trailing portions of the arms outwardly to move the bale holding members 9 and 10 away from each other sufficiently to receive a hay bale 2 therebetween. If in the opening movement, one arm tends to have freer movement than the other arm, it will swing out until the leading portion engages the ear or stop 37 and then its movement will stop and the other arm will be moved. After such opening, the tractor is backed to position the bale between the arms. If the tractor is backed until the beam strikes the bale the beam will project the extensible member and linkage from interference or damage from contact with the bale. The extensible member 12 is then extended to move the bale holding members 9 and 10 into clamping engagement with respective opposite ends of the hay bale 2. The extensible member 59 of the prime mover 5 may be retracted to raise bale handling members 9 and 10 by pivoting the frame structure 3 on the lower portions of the hitch 4 of the prime mover 4 and raise the hay bale 2, such as for placing on a truck or for moving the hay bale 2 to a desired storage location. During movement of the hay bale 2 it is preferred to have the projection 43 mounted on the upstanding post 15 and inserted into a side of the hay bale 2. When it is desired to unroll the hay bale 2 to provide feed for livestock, the projection 43 is removed from the upstanding post 15 and the bale holding members 9 and 10 are moved into clamping engagement with the opposite ends of the hay bale. The prime mover 5 then travels in a desired direction and the apparatus is then lowered by the extensible member 59 to move the bale 2 into engagement with a suitable surface. Forward movement of the prime mover 5 effects unrolling of the hay bale.

The bale handling apparatus 1 is positive in operation and substantially trouble free in use. The beam 14 and the upright post 15 protect the extensible member 12 and other operative parts of the bale handling apparatus 1 from engagement by the bale 2. The projection 43 retains a side portion of the bale 2 in engagement with the beam 14 and post 15. The projection 43 also prevents turning or rotation of the bale 2 when in position between the arms 6 and 7 and the beam 14 whereby the bale holding members 9 and 10 and the projection 43 cooperate to retain the bale 2 in the apparatus 1 during handling thereof.

The implement hitch 4 of the tractor 5 is preferably operable for raising, lowering, and tilting the frame structure 3. The hitch 4 includes a pair of arms extending from a transverse beam which is raised and lowered by an operator of the prime mover 5 to thereby raise and lower the frame structure 3. The extensible member 59 is extended during raising of the frame 3 and is retracted during lowering of the frame 3. The pair of arms of the hitch 4 are suitably pivotally connected to the transverse member 19 of the connector 16 whereby extension of the extensible member 59 of the prime mover 5 while the pair of arms of the hitch 4 are stationary tilts the trailing ends of the arms 6 and 7 downwardly and retraction of the extensible member 59 of the prime mover 5 while the pair of arms of the hitch 4 are stationary tilts the trailing ends of the arms 6 and 7 upwardly.

It is to be understood that while I have illustrated and described one form of my invention, it is not to be limited to the specific form or arrangement of parts herein described and shown.

What I claim and desire to secure by Letters Patent is:

1. A bale handling apparatus comprising:
   a. a frame structure having a beam extending transverse to the direction of travel of the frame structure and having opposite end portions and an upstanding member on said beam intermediate said ends;
   b. means on said beam and upstanding member for connecting same to an implement hitch of a prime mover with the hitch being operable for raising, lowering and tilting said beam;
   c. a pair of laterally spaced elongated arms each having an intermediate portion thereof swingably mounted on a respective one of the opposite end portions of said beam, said arms each having a leading end portion and a trailing end portion extending in opposed relation to said beam;
   d. means mounted on the trailing end portion of each of said arms for engaging a respective end portion of a hay bale;
   e. extensible means having opposite ends thereof each connected to the leading end portion of a respective one of said arms for selectively effecting swinging movement of the trailing end portions of said arms toward and away from each other with the movement toward each other urging the bale engaging means into clamping engagement with the hay bale, said beam being between such bale and said extensible means;

f. the swingable mounting of the intermediate portion of each of said arms on a respective one of the opposite end portions of said beam include:
 1. a saddle member mounted on the respective opposite end portion of said beam, said saddle member having an upper portion having the respective arm in sliding engagement therewith;
 2. a stop member mounted on said beam and positioned in engagement with said saddle member; and
 3. an upstanding ear extending upwardly from the upper portion of said saddle member and positioned to be engaged by said respective arm to limit swinging movement of the trailing end portions of said arms toward each other.

2. A bale handling apparatus as set forth in claim 1 including a second upstanding ear for each of said saddle members and laterally spaced from said respective first named upstanding ear, said second upstanding ear for each of said saddle members being positioned to be engaged by said respective arm to limit swinging movement of the trailing end portions of said arms away from each other.

3. A bale handling apparatus as set forth in claim 2 wherein:
 a. said bale engaging means are rotatably mounted on the trailing end portion of the respective arms; and
 b. the trailing edge portion of said frame has means mounted thereon for penetrating a side of the hay bale to thereby hold same against rotation, said bale penetrating means being removably mounted on said trailing edge portion of said frame.

4. A bale handling apparatus as set forth in claim 3 wherein said bale engaging means have an elongated bale penetrating member extending therefrom to define an axis for rotation of the hay bale.

5. A bale handling apparatus comprising:
 a. a substantially horizontally extending frame structure having a leading edge portion and a longitudinally spaced trailing edge portion, said trailing edge portion having a beam member extending transverse to the direction of travel of the frame structure and having opposite end portions, said leading edge portion having an end member extending transverse to the direction of travel of the frame structure, said trailing edge portion having an upstanding post thereon;
 b. an adjustable arm connected to said upstanding post and having a free end;
 c. means on said leading edge portion of said frame structure and the free end of said adjustable arm for connecting same to respective portions of an implement hitch of a prime mover with the hitch being operable for raising and lowering said trailing edge portion of said frame;
 d. a pair of laterally spaced arms each having an intermediate portion thereof swingably mounted about a vertical axis on a respective one of the opposite end portions of said beam member, said arms each having a leading end portion and a trailing end portion;
 e. means mounted on the trailing end portion of each of said arms for engaging a respective end portion of a hay bale;
 f. extensible means having opposite ends thereof each connected to the leading end portion of a respective one of said arms and spaced forwardly of said beam for selectively effecting swinging movement of the trailing end portions of each of said arms toward and away from each other with the movement toward each other urging the bale engaging means into clamping engagement with the hay bale; and
 g. spaced abutment means associated with the swingable mounting of the intermediate portion of each of said arms on the respective one of the opposite end portions of said beam member to engage the intermediate portion of said arms and to limit swinging movement of the trailing end portions of said arms both toward and away from each other.

6. A bale handling apparatus as set forth in claim 5 wherein said means to limit swinging movement of the trailing end portions of said arms toward and away from each other includes:
 a. a pair of laterally spaced saddle members each mounted on a respective one of the opposite end portions of said beam member, said saddle members each having an upper portion having a respective one of said arms in sliding engagement therewith;
 b. a pair of stop members each mounted on a respective one of the opposite end portions of said beam member, said stop members each being in engagement with a respective one of said saddle members to limit lateral movement thereof;
 c. a first upstanding ear for each of said saddle members and extending upwardly from the upper portion thereof and positioned to be engaged by said respective arm to limit swinging movement of the trailing end portions of said arms toward each other; and
 d. a second upstanding ear for each of said saddle members and extending upwardly from the upper portion thereof and positioned to be engaged by said respective arm to limit swinging movement of the trailing end portions of said arms away from each other.

7. A bale handling apparatus as set forth in claim 6 wherein:
 a. said bale engaging means are rotatably mounted on the trailing end portion of the respective arms thereby permitting unrolling of the hay bale;
 b. the trailing edge portion of said frame structure has means mounted thereon for penetrating a side of the hay bale to thereby hold same against rotation, said bale penetrating means being removably mounted on said trailing edge portion of said frame structure whereby the hay bale may be unrolled upon removal of said bale penetrating means; and
 c. said bale engaging means each have an elongated bale penetrating member extending therefrom to define an axis for rotation of the hay bale during unrolling thereof.

8. A bale handling apparatus comprising:
 a. a frame structure having a beam extending transverse to the direction of travel of the frame structure and having opposite end portions and an upstanding member on said beam intermediate said ends;

b. means on said beam and upstanding member for connecting same to an implement hitch of a prime mover with the hitch being operable for raising, lowering and tilting said beam;
c. a pair of laterally spaced elongated arms each having an intermediate portion thereof swingably mounted on a respective one of the opposite end portions of said beam, said arms each having a leading end portion and a trailing end portion extending in opposed relation to said beam;
d. means mounted on the trailing end portion of each of said arms for engaging a respective end portion of a hay bale;
e. extensible means having opposite ends thereof each connected to the leading end portion of a respective one of said arms for selectively effecting swinging movement of the trailing end portions of said arms toward and away from each other with the movement toward each other urging the bale engaging means into clamping engagement with the hay bale, said beam being between such bale and said extensible means; and
f. spaced abutment means associated with the swingable mounting of the intermediate portion of each of said arms on the respective one of the opposite end portions of said beam member to engage the intermediate portion of said arms and to limit swinging movement of the trailing end portions of said arms both toward and away from each other.

* * * * *